US009800161B2

(12) United States Patent
Crane et al.

(10) Patent No.: US 9,800,161 B2
(45) Date of Patent: Oct. 24, 2017

(54) POWER CONVERTERS (71) Applicant: GE Energy Power Conversion Technology Ltd, Warwickshire (GB)

(72) Inventors: Allan David Crane, Warwickshire (GB); Warren Mark Blewitt, Warwickshire (GB)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 69 days.

(21) Appl. No.: 14/683,528

(22) Filed: Apr. 10, 2015

(65) Prior Publication Data
US 2015/0295498 A1 Oct. 15, 2015

(30) Foreign Application Priority Data

Apr. 10, 2014 (EP) .................................... 14164219

(51) Int. Cl.
*H02M 3/335* (2006.01)
*G05F 1/14* (2006.01)
*H02M 1/00* (2006.01)

(52) U.S. Cl.
CPC .......... *H02M 3/33507* (2013.01); *G05F 1/14* (2013.01); *H02M 2001/0093* (2013.01)

(58) Field of Classification Search
CPC ....... H02M 2001/006; H02M 3/33507; H02M 5/12; H02M 2001/0093; G05F 1/14;
(Continued)

(56) References Cited

U.S. PATENT DOCUMENTS 3,275,929 A 9/1966 Schatz
4,739,466 A * 4/1988 Glennon ............... H02M 7/219
363/127

(Continued)

FOREIGN PATENT DOCUMENTS

CN 2531507 Y 1/2003
DE 4410902 A1 10/1994
(Continued)

OTHER PUBLICATIONS

Choi et. a.: "An analysis and implementation of step-dynamic voltage regulator", 2002 IEEE Power Engineering Society. Jan. 27-31, 20112; pp. 713-718.
(Continued)

*Primary Examiner* — Gustavo Rosario Benitez
(74) *Attorney, Agent, or Firm* — GE Global Patent Operation; Scott R. Stanley (57) ABSTRACT

A power converter arrangement is described. The power converter includes a dc link and a power converter. The dc link is operably connected between a generator, or other power source, that provides an output voltage in use and a dc network. The power converter includes an inverter connected across the dc link in parallel with the generator, an isolation transformer having a primary tap changer and a secondary tap changer, and a rectifier. The rectifier has ac terminals connected to the secondary tap changer, a first dc terminal connected to the dc link, and a second dc terminal connected to the dc network. The dc terminal voltage of the rectifier is therefore summated with the output voltage of the generator to provide a converter output voltage.

15 Claims, 4 Drawing Sheets

(58) Field of Classification Search
CPC ... G05F 1/147; H02J 3/383; H02J 3/12; H02J 3/382; H01F 27/29; H01F 29/04; H02P 13/06
See application file for complete search history.

(56) References Cited

U.S. PATENT DOCUMENTS

| | | | |
|---|---|---|---|
| 5,751,563 A | 5/1998 | Bjorklund | |
| 5,990,667 A | 11/1999 | Degeneff et al. | |
| 6,137,391 A | 10/2000 | Mitamura et al. | |
| 6,417,651 B1 * | 7/2002 | Kronberg | G05F 1/14 323/255 |
| 6,472,851 B2 | 10/2002 | Hammond | |
| 7,355,369 B2 | 4/2008 | Lavieville et al. | |
| 8,013,555 B2 | 9/2011 | Thornell-Pers | |
| 2007/0170909 A1 * | 7/2007 | Vorenkamp | G06F 1/266 324/76.11 |
| 2007/0296289 A1 * | 12/2007 | Wolf | H02K 3/28 310/68 D |
| 2009/0273241 A1 * | 11/2009 | Gazit | H02J 1/10 307/83 |
| 2010/0277002 A1 * | 11/2010 | Folts | H02J 3/383 307/82 |
| 2012/0133389 A1 * | 5/2012 | Schroeder | G01R 31/42 324/764.01 |
| 2013/0208521 A1 | 8/2013 | Trainer et al. | |

FOREIGN PATENT DOCUMENTS

| | | |
|---|---|---|
| DE | 102011011973 A1 | 8/2012 |
| DE | 102013102433 A1 | 9/2013 |
| EP | 2573899 A1 | 3/2013 |
| GB | 2513868 * | 11/2014 |

OTHER PUBLICATIONS

Toh et al., "A Voltage Quality Improvement Solution Using Step Dynamic Voltage Regulator", Power System Technology, 2000. Proceedings. PowerCon 2000. International Conference on (vol. 2 ), pp. 983-988, 2000.
Faiz et al., "New Solid-State Onload Tap-Changers Topology for Distribution Transformers", Power Delivery, IEEE Transactions on (vol. 18 , Issue: 1 ), pp. 136-141, Jan. 2003.
European Search Report and Written Opinion dated Nov. 21, 2014 which was issued in connection with EP Patent Application No. 14164219.9 which was filed on Apr. 10, 2014.

* cited by examiner

POWER CONVERTERS

BACKGROUND

Field of the Invention

The present invention relates to power converters, and in particular to power converters such as boost or step-up converters that can be used to interface a power source to a dc network.

Background Art

It is known to interface a generator, such as a renewable energy generator, that provides a variable high voltage direct current (HVDC) output voltage to an HVDC collection network using an inverter-transformer-rectifier boost converter arrangement. But since each stage is rated at full generator MVA, this arrangement has significant cost, physical size, mass and power losses.

SUMMARY OF THE INVENTION

An objective of the present invention is to provide an improved power converter (e.g., a boost or step-up converter) where only a relatively small proportion of the rated output power of the power source passes through a boosting part of the power converter.

The present invention provides a power converter arrangement comprising: a dc link electrically connectable between a power source that provides an output voltage in use and a dc network; and a power converter (e.g., a boost or step-up converter) comprising: an inverter having: dc terminals electrically connected across the dc link in parallel with the power source, and ac terminals; a transformer having: a primary winding electrically connected to the ac terminals of the inverter by a primary tap changer, and a secondary winding; and a rectifier having: ac terminals electrically connected to the secondary winding of the transformer by a secondary tap changer, a first dc terminal electrically connected to the dc link, and a second dc terminal electrically connectable to the dc network, such that the dc terminal voltage of the rectifier is summated with the output voltage of the power source (which is equivalent to a converter input voltage) to provide a converter output voltage.

In one arrangement where the dc network operates at a desired network voltage, the power converter can be operated to provide a converter output voltage that is substantially equal to the desired network voltage. Where the power source output voltage is less than the desired network voltage, the operation of the power converter will typically involve boosting (i.e., increasing) the power source output voltage.

The power converter arrangement can be used with any suitable power source having a dc output such as a dynamo-electric generator, a magnetohydrodynamic (MHD) generator, or a static source of power. A dynamoelectric generator can have any suitable construction (e.g., a conventional ac electrical machine whose output is connected to an ac/dc power converter, a brushless dc electrical machine that incorporates a power converter, a conventional dc electrical machine, or a homopolar electrical machine) and can be driven by any suitable drive source, e.g., a wind turbine assembly with one or more blades, a subsea turbine assembly, a turbine assembly that is driven by any other fluid, optionally being sourced from a reservoir or other energy store, or a prime mover. A static power source can be a photovoltaic or thermoelectric device array, for example.

The power converter uses a series injection boost arrangement such that only a relatively small proportion of the rated output of the power source (e.g., less than about 30%) passes through a 'boosting part' of the power converter, which comprises the inverter and the isolation tap changer transformer. The boosting part of the power converter is electrically connected in parallel with the power source by the inverter and is electrically connected in series with the power source by the rectifier that provides series mode voltage injection. Power regulation is carried out mainly by the primary and secondary tap changers and the inverter is typically controlled to accommodate the voltage steps between the transformer taps and to enhance bandwidth. This allows the boosting part of the power converter to be controlled to accommodate variations or changes in the power source output voltage and/or the network voltage.

The power source output voltage can also be regulated separately and is the primary means of limiting output fault current, for example.

In use, the dc link has an input side that is electrically connected to the power source and an output side that is electrically connected to the dc network. One or more series connected filter capacitors can be provided at the output side of the dc link such that the sum of the voltage across the capacitor(s) is the converter output voltage. In practice the one or more series connected filter capacitors can be part of the power converter arrangement or the dc network.

The inverter can be of any suitable type (e.g., two-, three- or multi-level, resonant single phase or polyphase, current source or voltage source) and can include a plurality of power electronic switching devices of any convenient type that is applicable to the inverter topology. The inverter can be controlled by any suitable control strategy, e.g., by pulse width modulation (PWM) or by varying the switching frequency if the inverter is a resonant type.

The primary and secondary tap changers can have any suitable construction (e.g., static, solid-state, switching device-assisted or mechanical) and any suitable arrangement of transformer taps. The transformer core can be any suitable material and any suitable switching frequency for the inverter can be employed.

The rectifier will typically be a diode bridge rectifier but other types of active rectifier can also be used. Such an active rectifier can be of any suitable type (e.g., two-, three- or multi-level, resonant single phase or polyphase, current source or voltage source) and can include a plurality of power electronic switching devices of any convenient type that is applicable to the active rectifier topology. The active rectifier can be controlled by any suitable control strategy, e.g., PWM.

The present invention further provides a method of operating a power converter arrangement comprising: a dc link electrically connectable between a power source that provides an output voltage in use and a dc network; and a power converter comprising: an inverter having dc terminals electrically connected across the dc link in parallel with the power source, and ac terminals; a transformer having a primary winding electrically connected to the ac terminals of the inverter by a primary tap changer, and a secondary winding; and a rectifier having: ac terminals electrically connected to the secondary winding of the transformer by a secondary tap changer, a first dc terminal electrically connected to the dc link, and a second dc terminal electrically connectable to the dc network such that the dc terminal voltage of the rectifier is summated with the output voltage of the power source to provide a converter output voltage; the method comprising the steps of: varying the primary-side voltage per winding turn of the transformer in accordance with the output voltage of the power source (which is equivalent to the converter input voltage); and/or varying the secondary-side voltage of the transformer in accordance with the output voltage of the power source and the converter output voltage.

It will be readily appreciated that the power source imposes a voltage on the transformer taps and that the primary-side voltage per winding turn can be controlled by selecting appropriate transformer taps. Controlling the primary-side voltage per winding turn effectively also controls the secondary-side voltage per winding turn and hence the secondary tap changer assembly is used to control the secondary-side voltage.

The effective turns ratio and voltage transformation ratio of the transformer can be adjusted in a stepwise manner by selecting the primary and secondary tap connections in a coordinated manner. A beneficial consequence of having tapped primary and secondary windings is that the resolution in steps of turns ratio and the total range of turns ratio can be maximised. A secondary beneficial consequence of having tapped primary and secondary windings is that a measure of control of leakage reactance is provided and this allows more flexibility in the control strategy of the inverter; it being the case that this leakage reactance affects the commutation processes of both inverter and rectifier, and that these commutation processes inherently have some influence on voltage regulation within the power converter. The ability to select primary tap connections is important in allowing the primary-side voltage per winding turn to be maintained within reasonable limits whilst the primary-side voltage varies, either as a result of variation in the power source output voltage or the inverter control strategy. It will be readily appreciated that the primary-side voltage per turn has a direct bearing on the magnetic flux density within the transformer core. It is undesirable if magnetic flux density is too high as this adversely affects magnetizing current (with consequent adverse effects on primary winding and inverter current ratings) and magnetic core power losses (iron loss adversely affects power conversion efficiency). The method can therefore further comprise the step of selectively operating the primary tap changer and/or the secondary tap changer to control flux density in the transformer core.

Further features of the power converter can be as described herein.

The present invention further provides a method of operating a power source-power converter arrangement comprising: a power source that provides an output voltage; a dc network; a dc link electrically connected between the power source and the dc network; and a power converter comprising: an inverter having: dc terminals electrically connected across the dc link in parallel with the power source, and ac terminals; a transformer having: a primary winding electrically connected to the ac terminals of the inverter by a primary tap changer, and a secondary winding; and a rectifier having: ac terminals electrically connected to the secondary winding of the transformer by a secondary tap changer, a first dc terminal electrically connected to the dc link, and a second dc terminal electrically connected to the dc network such that the dc terminal voltage of the rectifier is summated with the output voltage of the power source to provide a converter output voltage; the method comprising the steps of: operating the power converter to provide a converter output voltage that is substantially the same as a predefined voltage for the dc network when the output voltage of the power source is less than the predefined voltage (e.g., when a dynamoelectric generator is operating at less than its rated speed); and not operating the power converter when the output voltage of the power source is substantially the same as the predefined voltage for the dc network (e.g., when a dynamoelectric generator is operating at substantially its rated speed).

In the event that the power source output voltage is substantially the same as the network voltage, and is optionally additionally sufficiently high to overcome any steady state forward voltage drop of the diodes in a diode bridge rectifier, the operation of the inverter, transformer and tap changers is not required in order for the power source to deliver power to the dc network. Under these circumstances, the power converter can be set to a non-operating mode, e.g., by pulse suppressing the power electronic switching devices of the inverter after commutating the devices to an off state. When pulse suppressed, the operating stresses and power losses in the inverter, transformer and tap changers are minimal and this has beneficial effects on their respective failure rate and total system efficiency.

It will be readily appreciated that the resolution of transformer turns ratio and the capability of the inverter to control its output voltage have an influence upon the transition between the operating and non-operating modes of the inverter. It is therefore typical for the transition to be performed with the tap changers set to connect maximum primary-side winding turns with minimum secondary-side winding turns in circuit in order to achieve a substantially bump-free (or stepless) transition. In practice, the range of control of converter output voltage will normally always be sufficient to accommodate the resolution of steps in transformer turns ratio.

DETAILED DESCRIPTION

Figure 1:
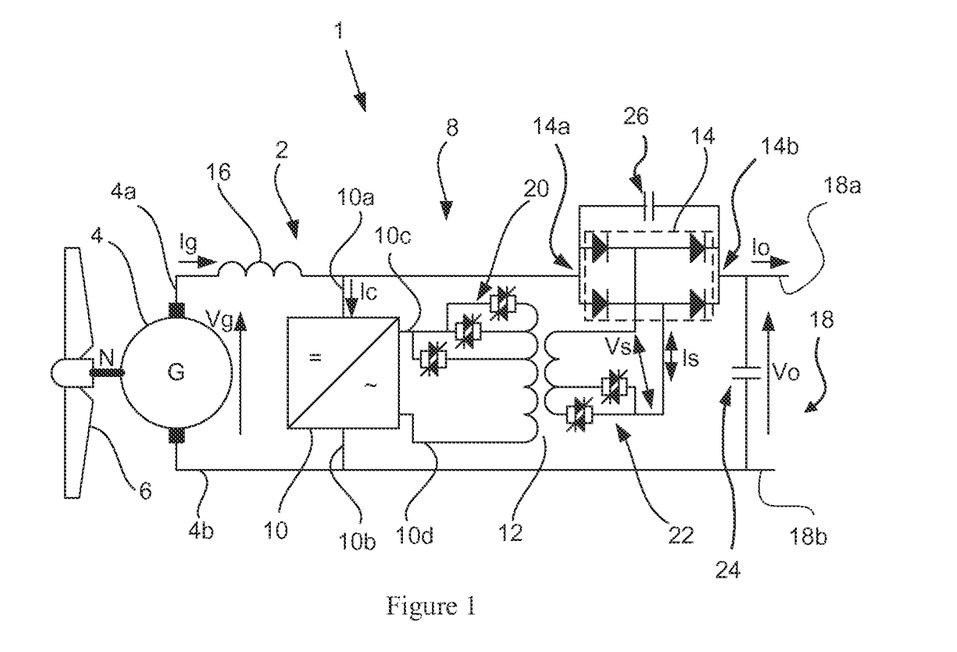
FIG. 1 is a schematic diagram of a power converter arrangement according to the present invention.

With reference to FIG. 1, a power converter arrangement 1 according to the present invention includes a dc link 2 that is connected to the output terminals of a high voltage direct current (HVDC) generator 4 that is driven by a wind turbine assembly 6. A boost (or step-up) converter 8 includes an inverter 10, an isolation tap changer transformer 12 and a diode bridge rectifier 14.

The dc link 2 includes an inductor 16 and/or a capacitor (not shown) and is connected to an HVDC collection network 18 by means of the diode bridge rectifier 14. The selection of dc link components is made according to the type of generator (or other power source) and inverter. For example, if the inverter 10 is a voltage source inverter (VSI) it would be necessary to include a capacitor, typically as an integral part of the inverter. If the inverter 10 is a current source inverter (CSI) it would be necessary to include an inductor but a capacitor would not normally be needed. The dc output of the generator (or other power source) can optionally incorporate a series connected inductor or a series connected inductance can be an inherent feature of the power source. The dc output of the generator (or other power source) can also optionally be substantially non-inductive.

The boost converter 8 provides a converter output voltage Vo and a converter output current Io. The converter output voltage Vo and converter output current Io are typically required to be substantially equal to a predefined voltage and current of the HVDC collection network 18. In other words, the converter output voltage Vo and the predefined voltage of the HVDC collection network 18 will be the same when the generator 4 is operating at rated speed.

The inverter 10 has dc terminals 10a, 10b that are connected to the dc link 2 in parallel with the generator 4. The first dc terminal 10a is positive with respect to the second dc terminal 10b and the generator 4 has correspondingly positive and negative terminals 4a, 4b. The inverter 10 receives an output voltage Vg from the generator 2. The generator output voltage Vg can also be referred to as a converter input voltage because it is the voltage that is applied to the dc terminals 10a, 10b of the inverter 10. The inverter 10 also receives a converter input current Ic which is a proportion of an output current Ig from the generator 4. The inverter 10 can have any suitable construction. In an embodiment the inverter 10 is of pulse width modulation (PWM) types. In an embodiment, the inverter 10 is of a type whose output may be regulated in a controlled manner.

The inverter 10 has ac terminals 10c, 10d that are connected to a primary tap changer assembly 20 of the transformer 12. A secondary tap changer assembly 22 of the transformer 12 is connected to ac terminals of the diode bridge rectifier 14. The diode bridge rectifier 14 has a first dc terminal 14a that is connected to the dc link 2 and a second terminal 14b that is connected to a positive terminal 18a of the HVDC collection network 18. The negative terminal 4b of the generator 4 is connected to a negative terminal 18b of the HVDC collection network 18. A dc output capacitor 24 is connected across the dc terminals 18a, 18b of the HVDC collection network 18.

A rectifier filter capacitor 26 is connected between the dc terminals 14a, 14b of the diode bridge rectifier 14 and reduces voltage ripple between the dc terminals 18a, 18b of the HVDC collection network 18.

The secondary voltage Vs of the transformer 12 is sufficient to allow the dc terminal voltage of the diode bridge rectifier 14 to compensate for any difference between the generator output voltage Vg and the predefined voltage of the HVDC collection network 18. The secondary current Is of the transformer 12 is also sufficient to allow the dc terminal current of the diode bridge rectifier 14 to be substantially equal to the predefined current of the HVDC collection network 18.

Figure 2:
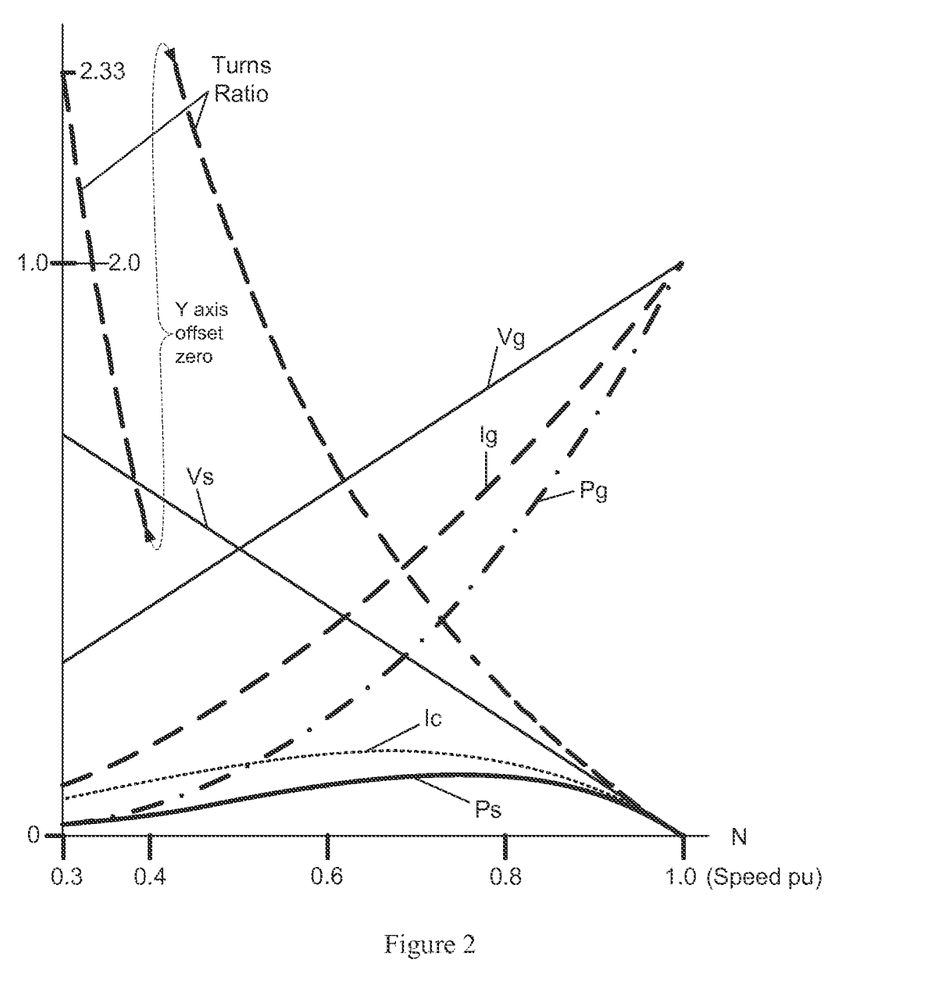
FIG. 2 is a graph showing the variation of operational parameters of the power converter arrangement as a function of speed.

The operating characteristics of the boost converter 8 can be described with reference to FIG. 2, which shows several y-axis variables expressed in per unit terms relative to 1 per unit rated output conditions, and a single y-axis variable (turns ratio) in absolute terms. All variables are with respect to per unit shaft speed N of the generator. The following description concentrates in particular on three operating conditions where the generator 4 is operating at: (a) minimum active speed, (b) rated speed and (c) an intermediate speed at which maximum power is supplied through the boost converter 8.

The generator output voltage Vg is approximately proportional to shaft speed N. The generator output current Ig is approximately proportional to generator torque, which is proportional to $N^2$. If it is assumed that the generator 4 has an active speed range between 0.3 pu (minimum active speed) and 1.0 pu (rated speed) it would be typical for the generator output voltage Vg to correspondingly vary between 0.3 pu (minimum active output voltage) and 1.0 pu (rated output voltage). The corresponding generator output power Pg is proportional to $N^3$ and varies between 0.027 pu (minimum active output power) and 1.0 pu (rated output power).

The generator output current Ig would vary between 0.09 pu (minimum active output current) and 1.0 pu (rated output current).

At the minimum active speed (i.e., N=0.3 pu) the boost converter 8 would contribute 0.0189 pu of the rated generator output power (i.e., (1.0-0.3)×0.027 pu) since the total output power delivered to the HVDC collection network 18 is only 0.027 pu of the rated generator output power and generator output voltage Vg must be boosted by 0.7 pu from 0.3 pu in order to attain the required 1.0 pu HVDC collection network voltage. Thus, at minimum active speed, the secondary power Ps delivered by the diode bridge rectifier 14 is only about 1.9% of the rated generator output power.

At rated speed (i.e., N=1 pu) the boost converter 8 would make no contribution (i.e., (1.0-1.0)×1.0 pu) since the total output power delivered to the HVDC collection network 18 is 1.0 pu of rated generator output power and generator output voltage Vg does not need to be boosted in order to attain the required 1.0 pu HVDC collection network voltage. Thus, at rated speed, the secondary power Ps delivered by the diode bridge rectifier 14 is 0% of the rated generator output power. In practice, at rated speed, the boost converter 8 can be transitioned to a non-operating mode where the power electronic switching devices in the inverter 10 are commutated to an off state and then pulse suppressed.

At intermediate speeds between the minimum active speed and rated speed it can be shown that the secondary power Ps varies and reaches a maximum of 0.10545 pu at approximately 0.75 pu of rated speed (i.e., N=0.75 pu). At this particular intermediate speed, the boost converter 8 would contribute 0.106 pu of the rated generator output power (i.e., (1.0-0.75)×0.4218 pu) since the total output power delivered to the HVDC collection network 18 is only 0.4218 pu of the rated generator output power and generator output voltage Vg must be boosted by 0.25 pu from 0.75 pu in order to attain the required 1.0 pu HVDC collection network voltage. Thus, at approximately 0.75 pu of rated speed, when the secondary power Ps delivered by the diode bridge rectifier 14 is at a maximum, it is still only about 10.6% of the rated generator output power.

The converter input current Ic also varies and reaches a maximum of 0.148 pu at about 0.65 pu speed.

The secondary voltage Vs varies from 0.7 pu to 0 pu as speed varies from 0.3 pu to 1.0 pu and this is performed by selectively connecting the ac terminals 10c, 10d of the inverter 10 to particular transformer taps of the primary tap changer assembly 20 and selectively connecting the ac terminals of the diode bridge rectifier 14 to particular transformer taps of the secondary tap changer assembly 22. The selection of the particular transformer taps, in combination, will typically be in accordance with the required voltage transformation ratio. The voltage transformation ratio of the transformer 12 is approximately pro rata with the primary to secondary turns ratio and hence both the primary and secondary tap changer assemblies 20, 22 can be used to adjust the turns ratio which, as shown in FIG. 2, varies from 1:2.33 (expressed as 2.33 absolute) to approximately 1:0 (expressed as zero absolute) as the speed varies from 0.3 pu to 1.0 pu. It will be readily appreciated that practical transformers cannot be made with a turns ratio of zero and it will be understood that transformer leakage reactance will be significant in reducing the primary to secondary voltage transformation ratio to a value that allows the secondary voltage to closely approach zero, and that any departure from the ideal zero voltage transformation ratio can be accommodated by controlling the output voltage of the inverter 10.

It can therefore be seen that the boost converter 8 has a significantly reduced VA rating when compared with a conventional boost converter which comprises similar inverter, transformer and rectifier components, each of which have a VA rating of 1.0 pu as all of the power that is transferred from the generator to the dc network passes through these power conversion stages. The comparative VA ratings of the equivalent components of the boost converter 8 are 0.148 pu for the inverter (from 0.148 pu rated current and 1.0 pu rated voltage), 0.106 pu for the transformer (from 0.04218 pu rated power and 0.25 pu rated voltage) and 0.7 pu for the rectifier (from 1.0 pu rated power and 0.7 pu rated voltage). The inverter and transformer are dominant in terms of overall cost whereas the rectifier cost is relatively insignificant when this is a simple diode bridge rectifier. The additional cost and complexity of the tap changers, and the additional copper termination hardware in the primary and secondary windings cannot be ignored but these additional costs are less significant than the associated cost reductions associated with VA rating reductions of 85.2% and 89.4% for the inverter and transformer, respectively.

Figure 3:
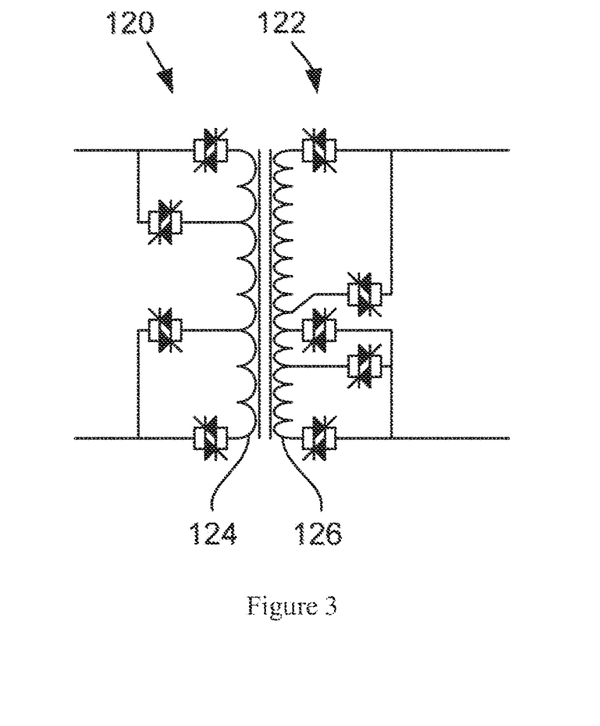
FIGS. 3 and 4 are schematic diagrams of alternative primary and secondary tap changer assemblies that can be used with the power converter arrangement of FIG. 1.

FIG. 1 shows simplified primary and secondary tap changer assemblies 20, 22. Alternative primary and secondary tap changer assemblies 120, 122 are shown in FIG. 3 and include static (or power electronic switching device-implemented) transformer taps at both ends of the primary and secondary windings 124, 126, respectively. The primary tap changer assembly 120 has two points of connection to static transformer taps at each end of the primary winding 124. The secondary tap changer assembly 122 has two points of connection to static transformer taps at a first end of the secondary winding 126 and three points of connection to static transformer taps at a second end of the secondary winding.

Figure 4:
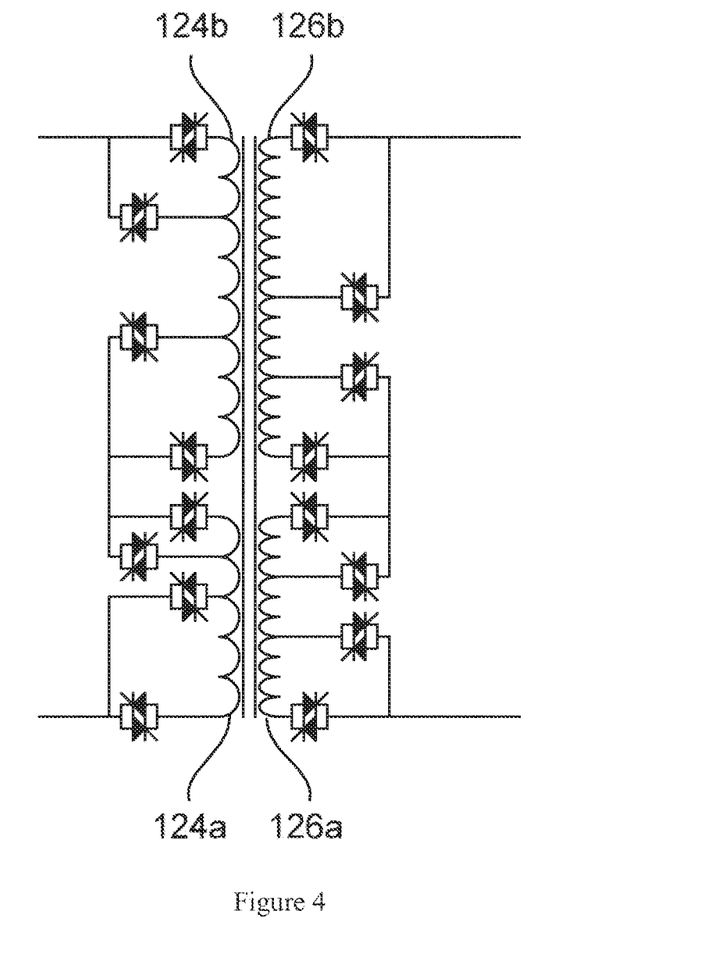

One or both of the primary and secondary tap changer assemblies 120, 122 can be replaced with alternative series connection tap changer assemblies shown in FIG. 4 in order to increase the transformer tap resolution without unreasonably increasing the number of switching device control channels. In order to facilitate this series connection, the primary winding is wound in two galvanically isolated sections 124a, 124b and the secondary winding is wound in two galvanically isolated sections 126a, 126b.

A binary or other weighting system can be applied to the intervals between the transformer taps in order to increase the turns ratio step resolution per switching device control channel.

The switching devices used in each transformer tap can be antiparallel connected thyristors and series redundancy can be employed by using series-connected strings of such switching devices. The thyristors that are required to conduct in order to allow the desired taps to be connected into circuit are turned on at a point in time when their anode-cathode voltage is reliably forward biased. Once turned on by gate control, the thyristors in the tap changer are not subjected to discontinuous current and the gate drive current need not be maintained throughout the conduction period. The process of natural commutation ensures that thyristors reliably turn off at the end of their respective conduction period. Thus, the control process of the tap changer is required to combine two aspects: the first determines which taps are to be connected and the second determines the points in time at which it is safe to turn on each particular thyristor. The process can be synchronised to a phase reference signal that is derived from any convenient winding or a dedicated winding in the transformer according to well-known phase control and static switch practice. The thyristors can employ known carrier lifetime reduction measures in order to optimise their power losses when inverter fundamental frequency is greater than industry standard ac power distribution frequencies and this aspect of system optimisation becomes significant at frequencies greater than 100 Hz.

The boost converter 8 is particularly, but not exclusively, applicable to arrangements where the generator output voltage Vg is substantially the same as the predefined HVDC collection network voltage when the generator 4 is operated at rated speed. Under these circumstances, the boost converter 8 may optionally be shut down when the generator 4 is at rated speed in order to reduce power losses. The inverter 10 may be simplified as a result of its minimal control range and this may further reduce power losses.

The diode bridge rectifier 14 is inherently simple and prevents the HVDC collection network 18 from back-feeding fault current.

It will be understood that the tap changer assemblies introduce complexity and failure modes but static tap changers are technically mature and readily available.

The generator 4 can be a multi-level active stator (MLAS) generator.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power converter arrangement, comprising:
a dc link electrically connectable to a power source; and
a power converter that includes:
a rectifier configured to electrically connect the dc link to a DC network;
an inverter having terminals that are connected to the dc link; and
a transformer having a primary tap changer assembly to electrically connect a primary winding of the transformer to the inverter, and a secondary tap changer assembly to electrically connect a secondary winding of the transformer to the rectifier, wherein the transformer includes static transformer taps at both ends of the primary winding and secondary winding, and the primary tap changer assembly has two points of connection to the static transformer taps at each end of the primary winding,
wherein at least one of the primary tap changer assembly and the secondary tap changer assembly are selectively operable to control flux density in a core of the transformer.

2. The power converter arrangement of claim 1, wherein the rectifier comprises a diode bridge rectifier.

3. The power converter arrangement of claim 1, wherein the transformer comprises an isolation tap changer transformer.

4. The power converter arrangement of claim 1, wherein the inverter comprises a voltage source inverter.

5. The power converter arrangement of claim 1, wherein the power converter is configured to increase an output voltage of the power source when the output voltage of the power source is less than a desired voltage of the DC network voltage.

6. The power converter arrangement of claim 1, wherein the secondary tap changer assembly has two points of connection to static transformer taps at a first end of the secondary winding and three points of connection to static transformer taps at a second end of the secondary winding.

7. A power converter, comprising:
a rectifier configured to electrically connect a dc link to a DC network;
an inverter having terminals that are connected to the dc link; and
a transformer having a primary tap changer assembly to electrically connect a primary winding of the transformer to the inverter, and a secondary tap changer assembly to electrically connect a secondary winding of the transformer to the rectifier, wherein the transformer includes static transformer taps at both ends of the primary winding and secondary winding, and the primary tap changer assembly has two points of connection to the static transformer taps at each end of the primary winding,
wherein at least one of the primary tap changer assembly and the secondary tap changer assembly are selectively operable to control flux density in a core of the transformer.

8. The power converter of claim 7, wherein the rectifier comprises a diode bridge rectifier.

9. The power converter of claim 7, wherein the transformer comprises an isolation tap changer transformer.

10. The power converter of claim 7, wherein the inverter comprises a voltage source inverter.

11. The power converter of claim 7, wherein the power converter is configured to increase an output voltage of the power source when the output voltage of the power source is less than a desired voltage of the DC network voltage.

12. The power converter of claim 7, wherein the secondary tap changer assembly has two points of connection to static transformer taps at a first end of the secondary winding and three points of connection to static transformer taps at a second end of the secondary winding.

13. A power converter arrangement, comprising:
a dc link electrically connectable to a power source; and
a power converter that includes:
a rectifier configured to electrically connect the dc link to a DC network;
an inverter having AC terminals that are selectively connectable to to the dc link; and
a transformer having a primary tap changer assembly to electrically connect a primary winding of the transformer to the inverter, and a secondary tap changer assembly to electrically connect a secondary winding of the transformer to the rectifier, wherein the primary tap changer assembly has two points of connection to static transformer taps at each end of the primary winding; and the secondary tap changer assembly has two points of connection to static transformer taps at a first end of the secondary winding and three points of connection to the static transformer taps at a second end of the secondary winding,
wherein ac terminals of the inverter are selectively connectable to transformer taps of the primary tap changer assembly and ac terminals of the rectifier are selectively connectable to transformer taps of the secondary tap changer assembly.

14. The power converter arrangement of claim 13, wherein the power converter is configured to increase an output voltage of the power source when the output voltage of the power source is less than a desired voltage of the DC network voltage.

15. The power converter arrangement of claim 13, wherein the transformer includes static transformer taps at both ends of the primary winding and secondary winding.

* * * * *